United States Patent [19]

Beyer

[11] Patent Number: 4,934,538
[45] Date of Patent: Jun. 19, 1990

[54] NESTABLE SHIPPING RACK

[75] Inventor: James A. Beyer, Northwood, Ohio

[73] Assignee: Libbey-Owens-Ford Co., Toledo, Ohio

[21] Appl. No.: 177,385

[22] Filed: Apr. 4, 1988

[51] Int. Cl.$^5$ .............................................. A47F 7/00
[52] U.S. Cl. .................................... 211/49.1; 211/194
[58] Field of Search ....................... 211/49.1, 41, 194; 108/55.1, 56.1, 53.1, 53.5; 206/453

[56] References Cited

U.S. PATENT DOCUMENTS

| | | | |
|---|---|---|---|
| 3,172,375 | 3/1965 | Farley et al. | 108/53.5 |
| 3,193,093 | 7/1965 | Hansen | 211/41 X |
| 3,249,072 | 5/1966 | Skubic | 108/53.5 |
| 3,499,398 | 3/1970 | Murray | 108/53.5 |
| 3,533,502 | 10/1970 | Hansen | 206/453 X |
| 3,945,501 | 3/1976 | Jay | 211/194 |
| 4,191,112 | 3/1980 | Maldonado | 211/194 X |
| 4,266,678 | 5/1981 | Daly | 211/194 |

Primary Examiner—Alvin C. Chin-Shue
Assistant Examiner—Sarah A. Lechok
Attorney, Agent, or Firm—Marshall & Melhorn

[57] ABSTRACT

A shipping rack for flat glass sheets and the like including a base for supporting the sheets on edge and an integral inclined rear wall against which they are supported. Vertical corner posts are affixed to the base behind the inclined wall. A removable split gate, comprised of two individual sections having interconnecting cross bar segments, is provided at the front of the rack. The rear frame is adapted to store the individual sections of the front gate when not in their working position, whereby the gate sections remain with the rack and a number of empty racks can be stacked in nested relationship for storage and return shipment.

20 Claims, 4 Drawing Sheets

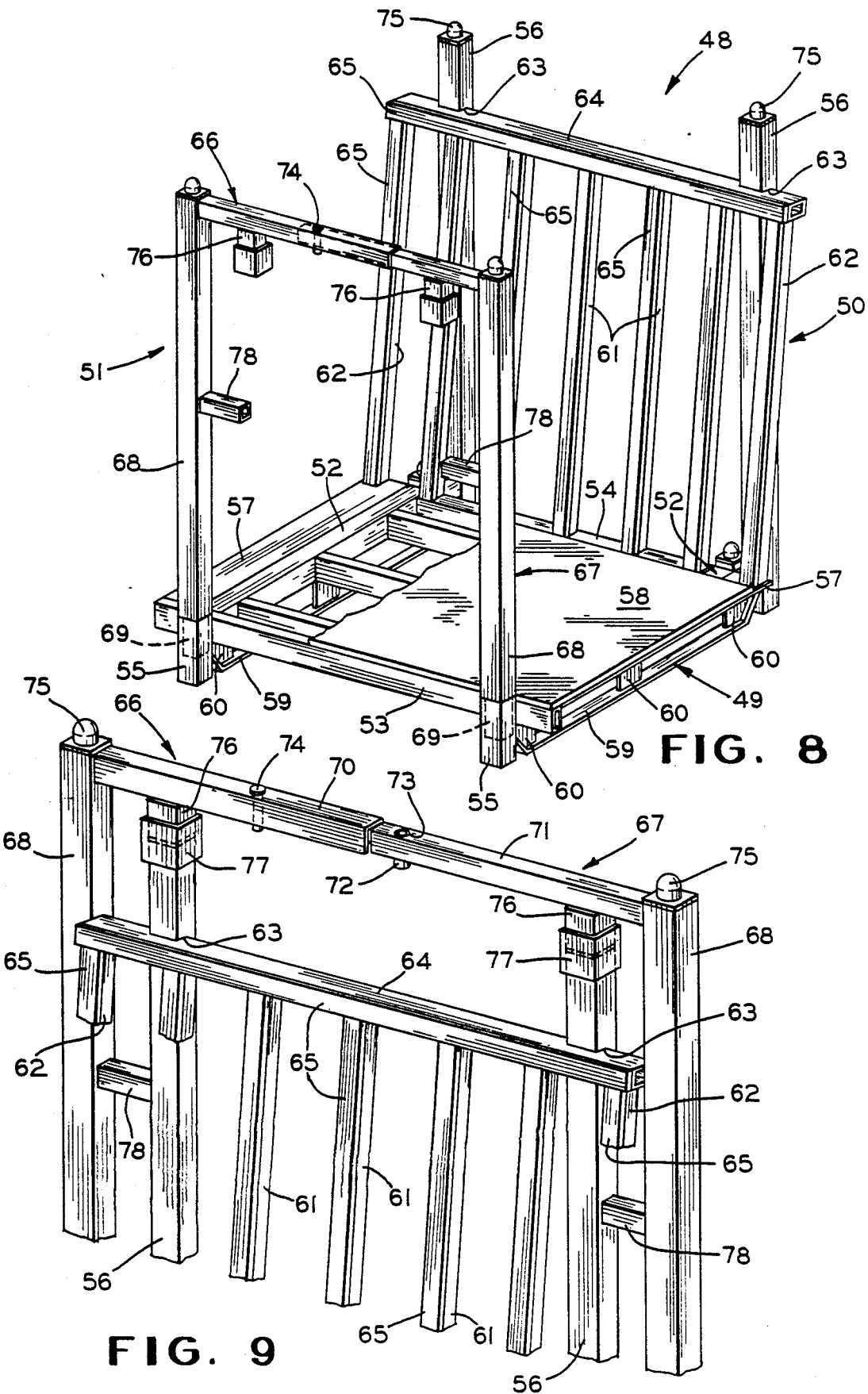

NESTABLE SHIPPING RACK

FIELD OF THE INVENTION

The present invention relates generally to reuseable shipping racks, and more particularly to racks adapted to transport glass sheets or the like and having a split front gate which is stowable on the rack so as to facilitate nesting of the racks for return shipment.

DESCRIPTION OF THE PRIOR ART

Reuseable shipping racks of various types have been in use for some time in bulk shipment of numerous articles, and in particular for transporting sheets of flat glass and articles fabricated from such sheets including, for example, insulating glass units and automotive glazing units. Such racks are disclosed, by way of example, in U.S. Pat. Nos. 3,938,660 to Moehring, 3,533,502 to Hansen, 4,010,849 to Pater et al, and 4,320,836 to Brown et al. As shown therein, the racks are typically fabricated of tubular steel in the form of a skeletal framework having a generally rectangular parallelepiped configuration. More particularly. the prior art racks normally include a base upon which the articles are supported upon edge, and an upstanding rear wall or frame against which they rest at a slightly inclined attitude. In order to permit stacking of the racks one upon another for shipment as by truck or railroad car, a front wall is provided including upstanding legs or corner posts. The front and rear corner posts may be interconnected above the base by end members defining end gates, and in order to facilitate loading and unloading of the rack at least a portion of the front wall may be in the form of a removable gate.

While racks such as those disclosed in the aforementioned patents perform well for their intended purpose, they have been found to have certain limitations which are overcome by the present invention. Thus, such racks are reuseable and must, of course, be return shipped when empty for reloading. Certain of the racks are not adapted to nest compactly when empty, so that transporting of the empty racks requires nearly as much, if not the same, space as transporting them when loaded, resulting in excessive cost for the return shipment. The prior art racks may include fixed front or partial front posts which not only preclude compact nesting of empty racks, but also interfere with loading and unloading of the racks. Those which employ end gates or frame members are unable to accommodate articles having a length and/or height greater than the rack as may be desirable in certain instances. When the front or end gates are removed from those prior art racks utilizing such members, for loading or unloading of the rack, there is no provision for stowage of the removed gate with the rack. Consequently, the gates tend to be laid aside where they may dangerously obstruct the workplace and may be damaged as by forklift units. In any event they become separated from the rack. If a number of the racks are to be stacked in nested relationship for return shipment, the gates are generally collected and banded separately for return shipment. As the gates are accumulated they tend to suffer physical abuse and are often lost or misplaced. As a result, the number of gates may not match the number of racks at any given station.

SUMMARY OF THE INVENTION

The novel shipping rack of the invention comprises a rectangular base upon which the sheets of glass or the like are stacked on edge, integral upstanding rear corner posts, and an inclined rear wall against which the stacked sheets rest. Front corner posts are removably received at their lower end in receptacles affixed to the base so as to be free standing without being interconnected to the corresponding rear post. The stacked sheets may thus extend beyond the ends of the rack where necessary without obstruction by transverse brace members. Each front corner post carries a segment of a longitudinal frame member, with the two segments of the frame member being adapted to be releasably interconnected between the corner posts. The corner posts and frame member segments thus define a split front gate for the rack. Means is provided on the rear of the rack and the frame member segments whereby the two sections of the split front gate may be placed directly on the rack when they are removed, for storage and return shipment, without interfering with nesting of the racks.

OBJECTS AND ADVANTAGES

It is, therefore, an object of this invention to provide a shipping rack for sheet-like articles which can accommodate articles having length and height greater than the rack itself.

Another object of the invention is to provide a shipping rack which nests compactly and securely with like racks for storage and return shipment.

Another object of the invention is to provide a shipping rack having a removable front gate which, when removed, affords unobstructed access from the front and ends of the rack.

Still another object is to provide such a shipping rack whose front gate is stowable on the rack upon its removal for access to the articles on the rack.

Yet another object is to provide such a shipping rack having a split front gate wherein the individual sections of the gate are stowable on the rack for return shipment therewith while permitting compact nesting of the rack with like racks.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 8 is a perspective view similar to FIG. 1, illustrating an alternate embodiment of the shipping rack and split gate; and FIG. 9 is an enlarged, fragmentary perspective view of the rear portion of the rack of FIG. 8, illustrating the split gate in its storage position on the rack.

DESCRIPTION OF THE PREFERRED EMBODIMENTS

Figures 1, 2:
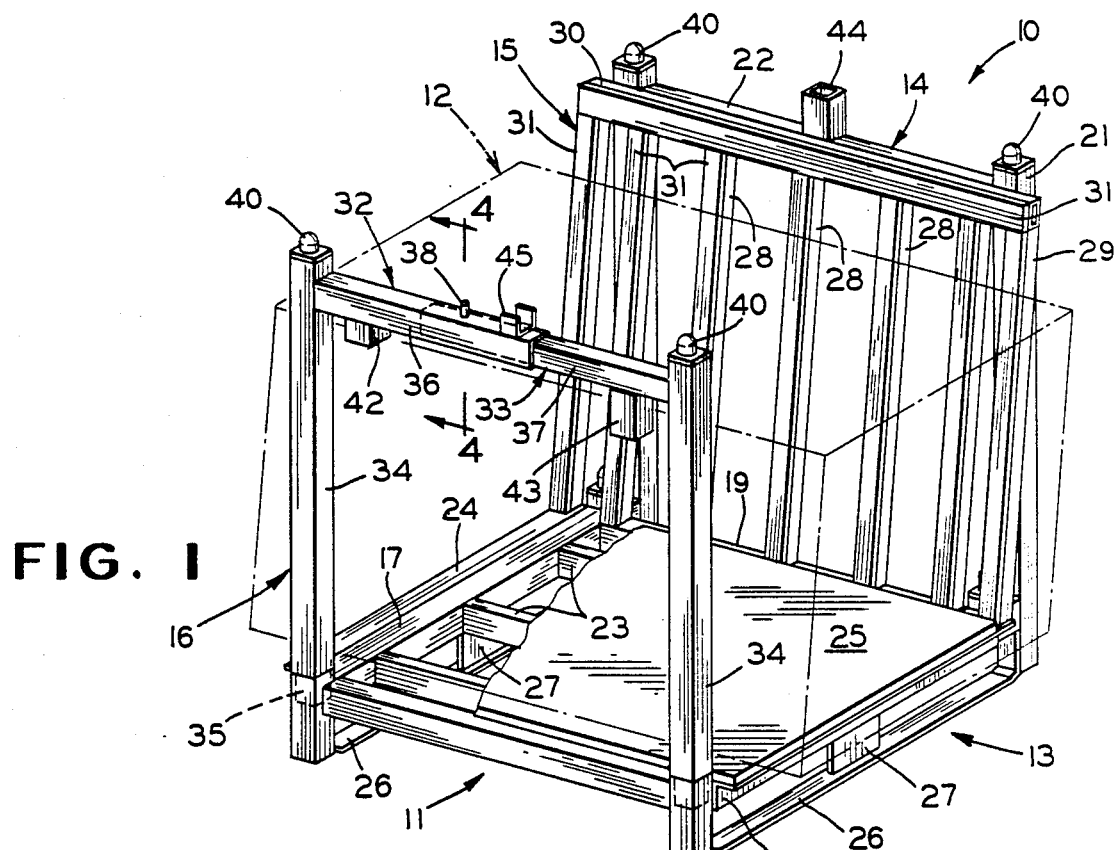
FIG. 1 is a front perspective view of a shipping rack constructed in accordance with the invention, with parts broken away and with the outline of a typical group of sheet units stacked thereon shown in broken lines.
FIG. 2 is a front perspective view of the rack, with parts broken away and with the split front gate moved from the work to the storage position.

Referring now to the drawings, and in particular to FIGS. 1 and 2, there is shown generally at 10 a reuseable shipping rack constructed in accordance with the invention comprising a skeletal framework 11 generally in the form of a parallelepiped, adapted to carry a cargo unit as shown in phantom at 12. As indicated hereinbefore, the novel rack has particular utility in the storing and transporting of glass sheet articles. Such articles are, of course, relatively heavy and frangible, and are preferably stored and transported standing on edge to utilize their greater structural strength in that attitude.

Figure 7:
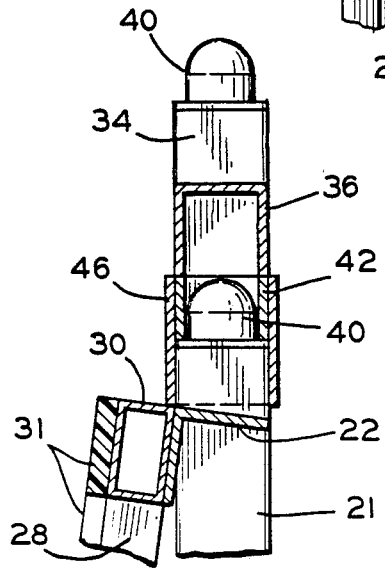
FIG. 7 is a transverse section taken substantially along line 7—7 of FIG. 6.

To that end, the rack 10 comprises a base 13, with an integral, vertically upstanding rear frame 14, an inclined support wall 15 and a removable front gate 16. The base 13 is designed to permit handling of the rack by conventional forklift units, and more particularly comprises a tubular framework defined by a pair of opposed side members 17, a front cross member 18 and a rear cross member 19. As best shown in FIG. 2, the side members 17 and front cross member 18 are affixed at their ends to upstanding stub posts 20. The side members 17 extend rearwardly beyond the rear cross member 19. Vertical corner posts 21 are affixed to the side members at their rear ends, with a horizontal, angle shaped cross bar 22 extending therebetween to comprise the rear frame 14. In order to accommodate the inclined support wall 15 as will be hereinafter explained, the cross bar 22 is installed at an angle consistent with the inclination of the support wall as shown in FIG. 7.

The base 13 includes a plurality of spaced, transverse support members 23 extending between the side members 17. In order to extend the base 13 beyond the skeletal framework 11, and increase the effective length of the base for purposes to be hereinafter described, angle sections 24 are affixed to the side members 17 with one of their flanges lying along the outer face of the side member and the other projecting outwardly to constitute an extension of the upper surface of the side member. In order to provide suitable support for the edges of the sheets or other cargo stacked upon the rack, there is provided on the base a continuous sheet 25 of a durable, resilient material such as plywood or a mat of other suitable material. Skid plates 26 extend between the lower ends of the stub posts 20 and rear corner posts 21, spaced from the side members 17, for carrying the rack upon a supporting surface (not shown) and providing for entry of the arms of a forklift unit in the usual manner. Intermediate braces 27 are provided between the skid plates and side members so that the forklift arms may enter on either side thereof. The skid plates also facilitate stacking of the racks in nested relationship as will be hereinafter explained.

The support wall 15 is inclined sufficiently so that as sheets are stacked on the base or edge, they may lean against the wall without danger of falling forwardly until such time as they are secured in place in the conventional manner as by straps or stretch wrap material (not shown) encircling the stack of sheets and wall and urging them against the wall. More particularly, the inclined support wall includes a plurality of stud members 28 spaced across the rack and affixed at their lower ends to the rear cross member 19. An additional stud member 29 is affixed to the horizontal flange of each angle section 24 so as to be spaced outwardly of the corresponding side member 17, whereby the corner post 21 and skid plate 26 may be inserted between the stud member 29 and adjacent stud 28 for nested stacking of the racks. A tubular plate member 30, affixed atop the studs 28 and 29, extends along the rear frame 14 and is secured to the corner posts 21 and cross bar 22 of the rear frame. The support wall 15 thus inclines and forms with the rear frame 14 and base 13, a rigid triangular structure against which the stack of sheets can be secured. In order to prevent harmful contact of the glass sheets with the metal framework, there is provided on the surfaces of the stud members 28 and 29 and tubular plate 30 facing the sheets suitable resilient protective strips 31. Alternatively, it is contemplated that a protective sheet as of suitable resilient insulating material may be inserted between the rear sheet and the stud members 28 and 29 and plate 30 in place of the strips 31.

The front gate 16 serves to protect the cargo on the loaded shipping rack against damage from the front, as well as to permit stacking of the racks one upon another for efficient use of space in shipping and storing. In order to facilitate loading and unloading of sheets upon the rack and to permit nesting of the racks for return shipment, it is highly desirable that the front gate be removable. As indicated above, various forms of removable front gates have been proposed in the prior art. However, adequate provision is not made in the prior art racks for storing the gate upon removal and retaining it with the rack for return shipment of the empty rack. The novel shipping rack of the present invention not only provides complete access from three sides for loading and unloading of the rack, but also provides for simple and convenient transfer of the front gate from the working position to a compact storage position on the rack itself.

To that end, the front gate 16 of the invention is split and comprises in the embodiment of FIGS. 1 to 5, left and right sections 32 and 33, respectively, each including a tubular corner post 34 having a mating extension 35 at its lower end for telescopic reception in the upstanding stub post 20 at the corresponding front corner of the rack. The two sections of the gate may thus be readily installed or removed by simply slipping the extension 35 on the post 34 into or out of the stub post 20.

The two sections 32 and 33 of the split gate include a sectional cross bar having coupling means by which they are interconnected in both the working and storage configurations. Thus, as best seen in FIGS. 1 and 2, the left section 32 includes a cross bar segment 36 of inverted channel shape affixed to the post 34 adjacent its top end. The right section 33 includes a tubular cross bar segment 37 affixed to the post 34 and adapted, when assembled in the working position as shown in FIG. 1, to extend into the channel-shaped segment 36. A pin 38 affixed to the tubular segment 37 projects through a corresponding opening 39 in the channel-shaped segment 36 to insure that the segments do not move longitudinally relative to one another. The diameter of the pin is somewhat smaller than that of the opening to assure easy assembly and disassembly of the two sections 32 and 33.

Figure 3:
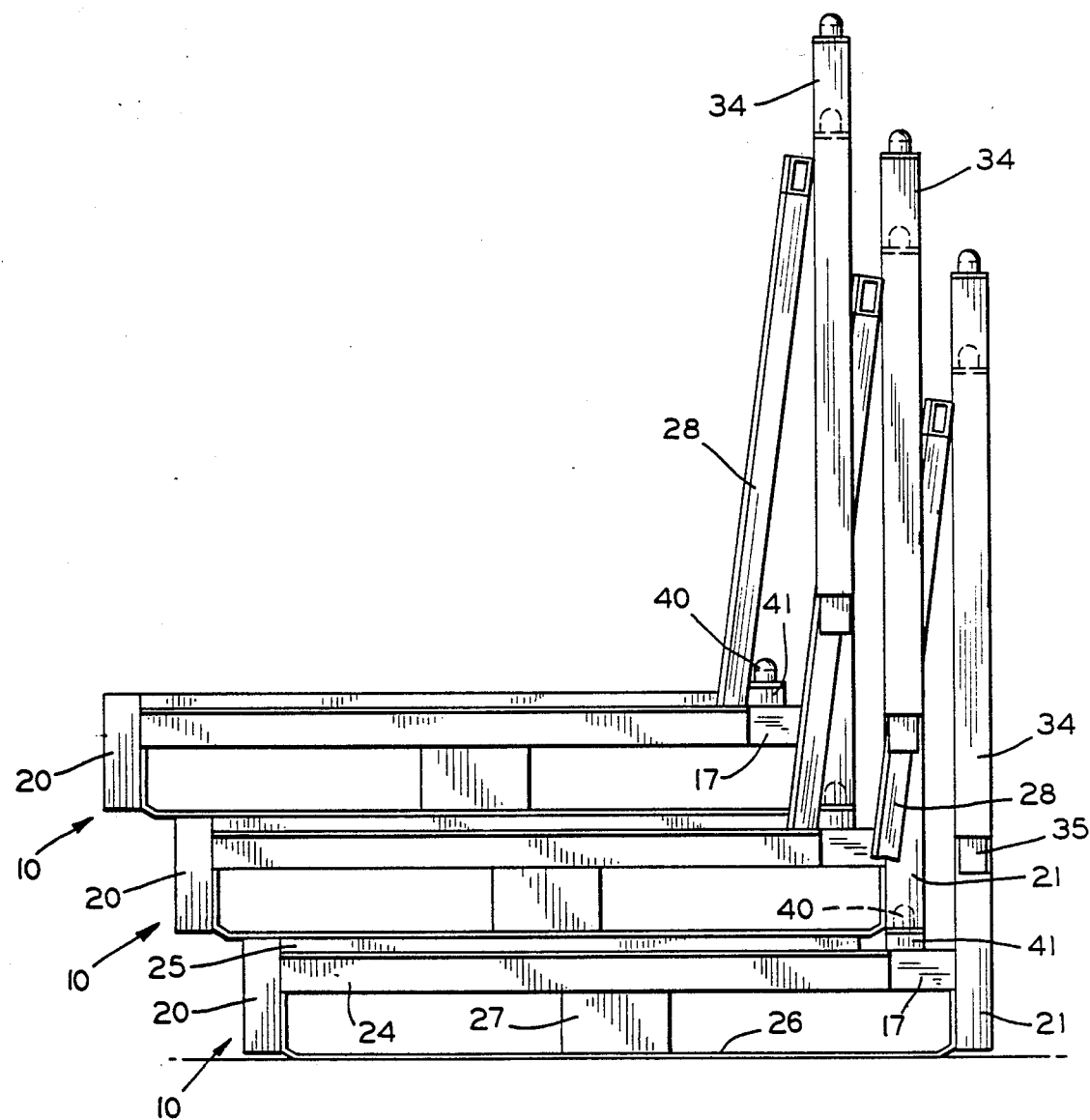
FIG. 3 is an end elevational view showing three of the racks stacked one upon another in nested relationship, with the split front gate sections in their storage position.
Figure 4:
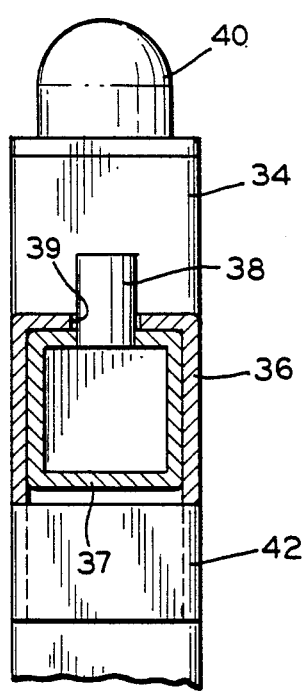
FIG. 4 is an enlarged, fragmentary, sectional view taken substantially along line 4—4 of FIG. 1.
Figure 5:
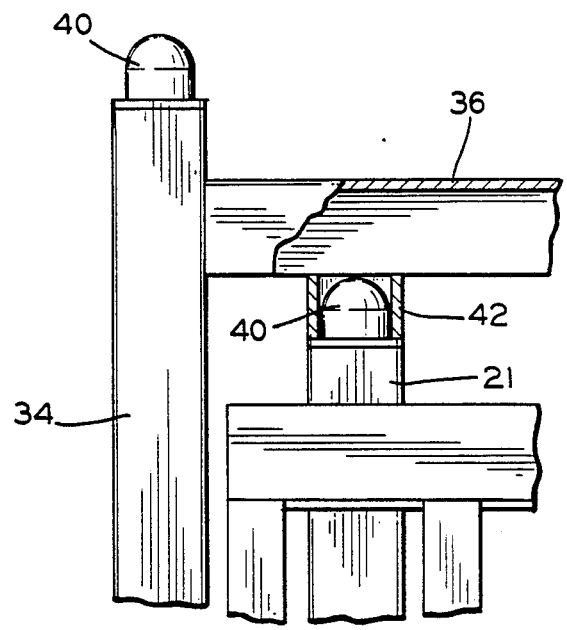
FIG. 5 is an enlarged, fragmentary front elevational view, partially in section, of the upper left corner portion of the rack of FIG. 2.

As hereinabove indicated, the loaded racks are adapted to be stacked vertically one upon another and the empty racks to be stacked in nested relationship. In order to accommodate such stacking, as well as to provide for storage of the sections 32 and 33 of the split front gate 16 on the rear of the rack, the vertical rear corner posts 21 and the front corner posts 34 are fitted on their top end with conventional stacking means 40 such as Bathey stacking caps adapted to receive and carry the open ends of tubular members such as the stub posts 20 and vertical corner posts 21. Dummy post sections 41, also having stacking caps 40, are affixed to the side members 17 between the base of the rear stud members 28 and the corner posts 21 for receiving the bottoms of the corner posts 21 of a nested rack as shown in FIG. 3.

In order to provide for storage of the front gate sections 32 and 33 on the rear frame 14, the cross bar segments 36 and 37 are provided along their underside with downwardly extending tubular sections 42 and 43, respectively, similar in cross section to the posts 20 and 21 so that they may be positioned on the stacking caps 40 in the manner shown in FIG. 2. A post 44 is provided on the horizontal cross bar 22 for supporting the overlapping ends of the cross bar segments 36 and 37. The tubular sections 42 and 43 and post 44 are of such length that in the storage configuration, the cross bar segments will extend horizontally with the segment 37 overlapping and resting upon the segment 36. The tubular sections 42 and 43 may, of course, rotate on the stacking caps 40. Thus, in order to retain the segments 36 and 37 in alignment on the rear frame, there is provided on top of the cross bar segment 36 a saddle 45 for receiving and confining the cross bar segment 37.

Figure 6:
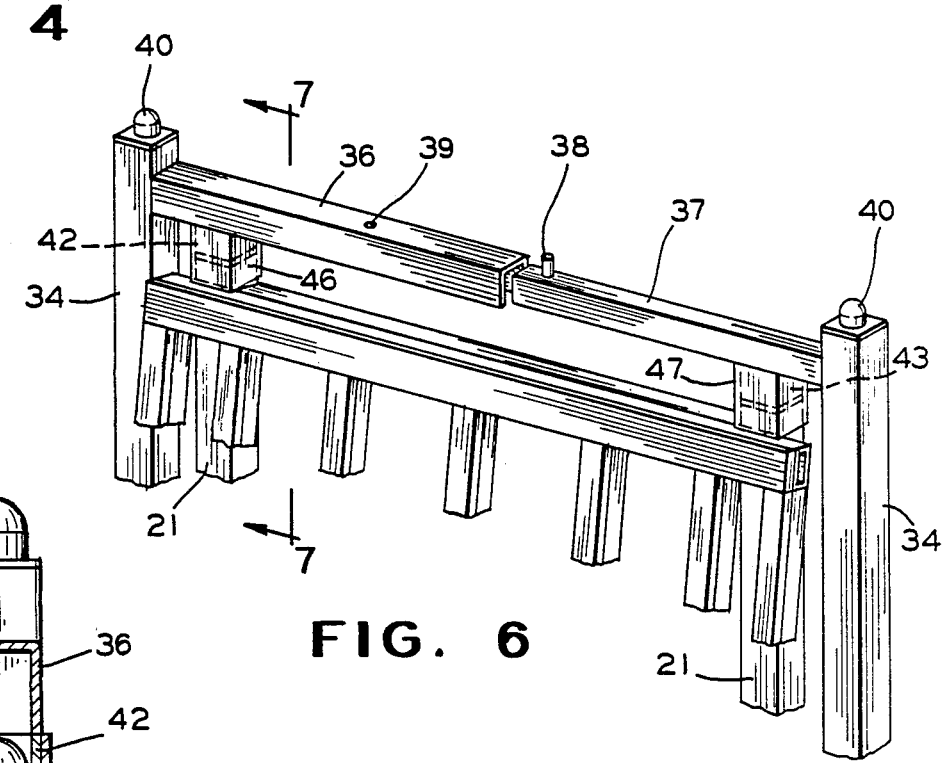
FIG. 6 is an enlarged, fragmentary, perspective view illustrating an alternate embodiment of the split gate in the storage position on the rack.

There is shown in FIGS. 6 and 7 an alternate embodiment of the split front gate providing a somewhat lower and more compact profile for the rack of FIGS. 1 to 5 when the gate is in the stored position, and avoiding the necessity for the two sections to be placed in or removed from the storage position in a particular sequence. Thus, in place of the tubular sections 42 and 43 of the embodiment of FIGS. 1 to 5, which rest on the stacking caps 40 and permit rotational movement of the tubular sections thereon, the alternate embodiment employs spacer sleeves 46 and 47 affixed to the cross bar segments 36 and 37, respectively, which telescope over the tops of the square corner posts 21 and stacking caps 40 thereon. The sleeves thus prevent swinging of the cross bar segments and maintain them in an upright, aligned position without use of the post 44 and the saddle 45 as in the previous embodiment. It is thus also unnecessary for the cross bar segments 36 and 37 to overlap in the storage position in order to maintain their alignment. Consequently, the cross bar segments are preferably of such length that when the two sections 32 and 33 of the gate are in place in their working position on the front of the rack, the cross bar segments 36 and 37 will overlap with the segment 37 received within the segment 36 and the pin 38 matingly received within the opening 39 in the manner of the embodiment of FIG. 1. However, when placed in the storage position as illustrated in FIG. 6, the adjacent ends of the cross bar segments 36 and 37 are in adjacent, slightly spaced relationship. Since the cross bar segments do not overlap, the sequence in which the gate sections 32 and 33 are placed in and removed from the storage position is immaterial.

Another embodiment of the novel shipping rack is shown in FIGS. 8 and 9. As will be best seen in FIG. 8, in this embodiment the rack, indicated generally at 48, comprises a base 49 with an integral, upstanding rear frame 50 and a removable front gate 51. Again, the base is designed to permit handling of the rack by forklift units and to that end comprises a tubular framework defined by a pair of opposed side members 52 interconnected by a front cross member 53 and a rear cross member 54. For a purpose to be described, the front cross member extends outwardly beyond the side member 52 at each of its ends. Affixed to the external front face of the front cross member 53 in longitudinal alignment with the side members 52 are upstanding tubular stub posts 55. The side members 52 extend rearwardly beyond the rear cross member 54, and vertical rear corner posts 56 are affixed to the side members at their rear ends.

The base further includes a plurality of spaced, transverse support members extending between the side members 52. In order to extend the effective length of the base 49, plate members 57 are mounted flush with the top surfaces of the side members 52 and front cross member 53 and outwardly of the side members. The plate members are affixed at their front end to the extended end portions of the front cross member. Transversely extending gusset plates (not shown) are provided at spaced locations beneath and throughout the length of the plate members for supporting them upon the side members 52. In order to provide suitable support for the edges of the sheets or other cargo stacked upon the rack, there is provided upon the base a continuous sheet or mat 58 of a suitable material. Skid plates 59 extend between the stub posts 55 and rear posts 56, with brace members 60 being provided between the skid plates and the adjacent side members 52 spaced therefrom.

The rear frame 50 inclines upwardly and rearwardly from the base 49, the supporting surfaces of the frame and base defining therebetween an angle on the order of 97°, for example. The inclined rear frame 50 comprises a plurality of stud members 61 spaced across the rack and affixed at their lower ends to the rear cross member 54. An additional stud member 62 is affixed to each of the plate members 57 so as to be spaced outwardly of the corresponding side member 52 whereby the rear corner post 56 and skid plate 59 may be inserted between the stud member 62 and adjacent stud 61 for nested stacking of the racks. The rear corner posts 56 are suitably notched at 63 to receive a tubular plate member 64 affixed atop the stud members 61 and 62. The stud members 61 and 62 and plate member 64 thus form with the vertical rear posts 56 a rigid triangular structure against which the stack of sheets can be secured. Suitable resilient protective strips 65 may be provided on the surfaces of the stud members and the tubular plate facing the sheets, and/or a disposable protective sheet (not shown) of suitable resilient material may be inserted between the stud members and tubular plate and the adjacent surface of the first sheet on the rack.

The front gate 51 of the embodiment of FIGS. 8 and 9 again comprises left and right sections 66 and 67, respectively, which need not be placed in the storage position in a particular sequence. Thus, each section includes a tubular corner post 68 having a mating extension 69 at its lower end for telescopic reception in the upstanding stud post 55 at the corresponding front corner of the rack. The left section 66 includes a cross bar segment 70 of inverted channel shape affixed to the post 68, while the right section 67 includes a cross bar segment 71 affixed to the post 68 and adapted, when the front gate is assembled in the working position as shown in FIG. 8, to matingly extend into the channel-shaped segment 70. The cross bar segments 70 and 71 are of such length that when placed in the storage position as will be hereinafter explained, their ends will be adjacent but spaced from one another. In order to secure the segments 70 and 71 against longitudinal movement relative to one another in the working position, a pipe segment 72 is affixed within an opening 73 in the segment 71 for receiving a pin 74 secured to the channel-shaped cross bar segment 70. The internal diameter of the pipe segment 72 is somewhat greater than the external diameter of the pin 74 in order to facilitate insertion of the pin and yet, due to the extended mating distance of the pin within the pipe segment, the overlapping cross bar segments are relatively rigidly interconnected.

In order to accommodate the aforementioned stacking of loaded and empty racks, the vertical rear corner posts 56 and the front corner posts 68 are provided at their upper ends with conventional stacking means 75, such as the so-called Bathey or Livonia stacking caps, adapted to receive and carry the open lower ends of the stub posts 55 and the corner posts 68. Dummy post sections 76, having stacking caps 75, are affixed to the side members 52 behind the rear cross member 54 for receiving the bottoms of the corner posts 56 of nested racks.

In order to provide for storage of the front gate sections 66 and 67 on the rear frame 50 as shown in FIG. 9, the cross bar segments 70 and 71 are each provided on their underside with a downwardly extending tubular section 76 adapted to mate with the stacking cap 75 on the corresponding corner post 56. Each of the tubular sections 76 is provided with a sleeve 77 adapted to telescope over the end of the corner post so as to maintain the gate sections in upright, non-rotatable positions. In order to further stabilize the gate sections in the storage position and insure that they maintain their upright position during shipment, each of the tubular corner posts 68 is provided with an inwardly directed horizontal stem or strut 78 of a length such that its free and bears against the outside of the adjacent rear corner post 56. The position of the tubular sections 76 which carry the gate sections is such that the corner posts 68 tend to pivot inwardly thereabout. Thus, the struts 78 maintain the gate sections in the proper attitude to prevent them from becoming disengaged from the corner posts 56 in the storage position during return shipment.

Briefly reviewing operation of the invention, a rack is positioned for loading with glass sheets, either manually or by a mechanical sheet handling device, as from a conveyor at the end of a fabricating process. The empty rack will arrive at the loading station with the two sections of the split front gate stored upon the rear frame. When the requisite number of sheets has been stacked upon the rack, the appropriate section of the front gate will be removed from its storage position as shown in FIGS. 2, 6 and 9 and placed in the shipping position as shown in FIGS. 1 and 8. Then the other section will be moved from the storage to the shipping position. Banding straps or stretch wrap material (not shown) may be placed around the stack of sheets and rear support wall in the conventional manner, either before or after the front gate is installed, to secure the stack to the rack. The rack is then ready for transport. With the loaded rack in position for unloading, the procedure is reversed. Thus, the appropriate section of the front gate is first removed and transferred directly to the rear frame for storage, and then the other section is removed and stored.

When the rack is unloaded it may be stacked in nested relation with other similar racks as shown in FIG. 3. The gate sections will be retained with each rack as it is stored or return shipped. Although generally unnecessary, the nested racks and gate sections may be secured by straps in a conventional manner where deemed appropriate to assure that they do not become dislodged or separated during shipment. As will be apparent, the shipping rack of the invention is able to accommodate sheet or other material which is of greater length than the rack itself due to the absence of braces extending between the front gate and rear frame. It is to be understood that the forms of the invention herewith shown and described are to be taken as preferred embodiments only of the same, and that various changes in the shape, size, and arrangement of parts may be resorted to without departing from the spirit of the invention.

What is claimed is:

1. A rack for storing and shipping a stack of upstanding individual sheets or the like comprising, in combination, a generally rectangular base upon which the sheets are shacked upon edge, an upstanding frame at the rear of said base, said frame including a rear corner post at each end thereof and a support wall adapted to support said upstanding stack, a pair of interconnecting upstanding gate sections adapted to be removably affixed to said base along the front edge thereof, each said agent section comprising a front corner post and a cross bar segment affixed to said front corner post adjacent its upper end, and a tubular member depending downwardly from each said cross bar segment, each said tubular member including coupling means adapted to mate with a said rear corner post for carrying said gate sections on said upstanding rear frame upon their removal from said base.

2. A rack for storing and shipping a stack of sheets or the like as claimed in claim 1, wherein said base includes a pair of spaced side members interconnected by front and rear cross members, said side members extending beyond said rear cross member, one of said rear corner posts being connected to each of said side members behind said rear cross member.

3. A rack for storing and shipping a stack of sheets or the like as claimed in claim 2, including a horizontal cross bar interconnecting said rear posts adjacent their upper ends and a support post extending upwardly from said cross bar intermediate the ends thereof for supporting said cross bar segments with said gate sections on said rear frame.

4. A rack for storing and shipping a stack of sheets or the like as claimed in claim 3, including a stacking cap on the upper end of each said vertical rear post for receiving and supporting the open end of a said tubular member, 5. A rack for storing and shipping a stack of sheets or the like as claimed in claim 2, wherein said support wall inclines upwardly and rearwardly from said base, said support wall comprising a plurality of stud members extending upwardly from and spaced along said rear cross member and a plate member extending across the tops of said stud members and along said rear corner posts.

6. A rack for storing and shipping a stack of sheets or the like as claimed in claim 5, including an angle member extending along the outside of each said side member with one of its flanges projecting outwardly and forming a continuation of the upper surface of said side member, and an additional stud member affixed to said flange outside each said side member extending upwardly and rearwardly to said plate member.

7. A rack for storing and shipping a stack of sheets or the like as claimed in claim 6, including a stacking cap on each said side member between said support wall and said vertical rear corner post for receiving the lower end of the vertical rear corner post of a second one of said racks stacked on said rack in nested relationship therewith.

8. A rack fore storing and shipping a stack of sheets or the like as claimed in claim 1, including an upstanding tubular stub post at each front corner of said base, each said front corner post having its lower end adapted to releasably mate with one of said stub posts for supporting said front corner post in upright position on said base, said cross bar segments including complementary connecting means for interconnecting said gate sections with said front corner posts in said upright position on said base.

9. A rack for storing and shipping a stack of sheets or the like as claimed in claim 8, wherein the cross bar segment of one of said gate sections comprises a channel-shaped member and the cross bar segment of the other of said gate sections comprises a tubular member, said cross bar segments being adapted to overlap with said tubular segment axially received in said channel-shaped member when said gate sections are installed on said base.

10. A rack for storing and shipping a stack of sheets or the like as claimed in claim 9, wherein said tubular members are located on aid cross bar segments so that said front corner posts of said gate sections are positioned outwardly of said rear corner posts with said gate sections on said rear frame, said cross bar segments being of such length that their adjacent ends are slightly spaced from one another with said gate sections on said rear frame.

11. A rack for storing and shipping a stack of upstanding individual sheets or the like comprising, in combination, a generally rectangular base upon which the sheets are stacked upon edge, an upstanding frame at the rear of said base including a support wall adapted to support said upstanding stack of sheets, a pair of interconnecting upstanding gate sections adapted to be removably affixed to said base along the front edge thereof, and means for carrying each of said gate sections on said upstanding rear frame upon its removal from said base, including an upstanding tubular stub post at each front corner of said base, each said gate section including a front corner post having its lower end adapted to releasably mate with one of said stub posts for supporting said front corner post in upright position on said base, and a cross bar segment affixed to said front corner post adjacent the upper end thereof, said cross bar segments including complementary connecting means for interconnecting said gate sections with said front corner post in said upright position on said base, the cross bar segment of one of said gate sections comprising a channel-shaped member and the cross bar segment of the other of said gate sections comprising a tubular member, said cross bar segments being adapted to overlap with said tubular member axially received in said channel-shaped member when said gate sections are installed on said base, including an opening in the base of said channel-shaped cross bar member and a pin projecting from said tubular cross bar member adapted to be received in said opening for securing said channel-shaped and tubular cross bar members against relative axial movement with said gate sections installed on said base.

12. A rack for storing and shipping a stack of sheets or the like as claimed in claim 11, including a pipe segment affixed in said opening for receiving said pin, said pipe segment having an internal diameter slightly greater than the external diameter of said pin and a length substantially equal to said pin.

13. A rack for storing and shipping a stack of sheets or the like as claimed in claim 11, wherein said means for carrying said gate sections on said rear frame includes a first tubular section depending downwardly from said channel-shaped cross bar member and a second tubular section depending downwardly from said tubular cross bar member, said first and second tubular sections being adapted to be received on said rear corner posts.

14. A rack for storing and shipping a stack of sheets or the like as claimed in claim 13, including a second opening in the base of said channel-shaped cross bar segment for alternatively receiving said pin with said gate sections stored on said rear frame.

15. A rack for storing and shipping a stack of sheets or the like as claimed in claim 13, wherein said base includes a pair of spaced side members interconnected by front and rear cross members, said side members extending beyond said rear cross member, said upstanding rear frame comprising a vertical rear post affixed to the end of each said side member behind said rear cross member and a horizontal cross bar interconnecting said rear posts adjacent their upper ends, a stacking cap on the upper end of each said vertical rear post, said stacking caps being adapted to receive the ends of said first tubular section on said channel-shaped cross bar segment and said second tubular section on said tubular cross bar segment for carrying said gate sections on said rear frame, and a support post extending upwardly from said horizontal cross bar intermediate the ends thereof for supporting the overlapping ends of said channel-shaped and tubular cross bar members.

16. A rack for storing and shipping a stack of sheets or the like as claimed in claim 15, wherein said channel-shaped cross bar segment opens downwardly, including a saddle member affixed to the base of and opening upwardly from said channel-shaped cross bar members for receiving said tubular cross bar members with said gate sections on said rear frame.

17. A rack for storing and shipping a stack of sheets or the like as claimed in claim 13, wherein said vertical rear posts are of polygonal cross section, and said first tubular section on said channel-shaped cross bar segment and said second tubular section on said tubular cross bar segment are adapted to telescope over the upper ends of said rear posts whereby relative rotational movement therebetween is precluded.

18. A rack for storing and shipping a stack of upstanding individual sheets or the like comprising, in combination, a generally rectangular base upon which the sheets are stacked upon edge, an upstanding frame at the rear of said base including a support wall adapted to support said upstanding stack of sheets, a pair of interconnecting upstanding gate sections adapted to be removably affixed to said base along the front edge thereof, and means for carrying each of said gate sections on said upstanding rear frame upon its removal from said base, including an upstanding tubular stub post at each front corner of said base, each said gate section including a front corner post having its lower end adapted to releasably mate with one of said stub posts for supporting said front corner post in upright position on said base, and a cross bar segment affixed to said front corner post adjacent the upper end thereof, said cross bar segments including complementary connecting means for interconnecting said gate sections with said front corner post in said upright position on said base, including a stacking cap on the upper end of each said rear post, a tubular section depending downwardly from each said cross bar segment adapted to be received on one of said stacking caps for supporting the associate gate section on said rear frame, and a sleeve on each said tubular section adapted to telescope over the end of a said rear post for maintaining said gate section in upright position.

19. A rack for storing and shipping a stack of sheets or the like as claimed in claim 18, wherein said front corner posts of said gate sections are adapted to be positioned outwardly of said rear corner posts with said gate sections on said rear frame, including a strut member affixed to and projecting inwardly from each said front corner post beneath said cross-bar segment for bearing against the adjacent rear corner post to further maintain the gate section in upright position.

20. A rack for storing and shipping a stack of sheets or the like as claimed in claim 19, wherein the cross bar segment of one of said gate sections comprises a channel-shaped member and the cross bar segment of the other of said gate sections comprises a tubular member, said cross bar segments being of such length as to overlap with said tubular member axially received in said channel-shaped member when said gate sections are installed on said base and to have their adjacent ends slightly spaced from one another with said gate sections on said rear frame, including an opening in the base of said channel-shaped cross bar, a pipe segment affixed in said opening, and a pin projecting from said tubular cross bar member adapted to be received in said pipe segment for securing said channel-shaped and tubular cross bar member against relative axial movement with said gate sections installed on said base.

* * * * *

UNITED STATES PATENT AND TRADEMARK OFFICE
CERTIFICATE OF CORRECTION

PATENT NO. : 4,934,538
DATED     : June 19, 1990
INVENTOR(S) : James A. Beyer

It is certified that error appears in the above-identified patent and that said Letters Patent is hereby corrected as shown below:

Column 8, kine 36, change "shacked" to --stacked--, line 41, change "agent" to --gate--;and line 68, change the comma (",") to a period (--.--).

Column 9, line 24, change "fore" to --for--.

Column 12, line 25, change "member" to --members--.

Signed and Sealed this

Eighteenth Day of August, 1992

Attest:

DOUGLAS B. COMER

Attesting Officer

Acting Commissioner of Patents and Trademarks